US009990356B2

(12) United States Patent
Yoon et al.

(10) Patent No.: US 9,990,356 B2
(45) Date of Patent: Jun. 5, 2018

(54) DEVICE AND METHOD FOR ANALYZING REPUTATION FOR OBJECTS BY DATA MINING

(71) Applicant: Institute for Sustainable Development, Incheon (KR)

(72) Inventors: Dukchan Yoon, Goyang-si (KR); Jiyeon Lim, Bucheon-si (KR)

(73) Assignee: Institute of Sustainable Development, Incheon (KR)

( * ) Notice: Subject to any disclaimer, the term of this patent is extended or adjusted under 35 U.S.C. 154(b) by 9 days.

(21) Appl. No.: 14/947,211

(22) Filed: Nov. 20, 2015

(65) Prior Publication Data
US 2017/0004128 A1    Jan. 5, 2017

(30) Foreign Application Priority Data

Jul. 1, 2015    (KR) ........................ 10-2015-0094132

(51) Int. Cl.
*G06F 17/27*    (2006.01)
*G06F 17/30*    (2006.01)
*G06Q 10/06*    (2012.01)

(52) U.S. Cl.
CPC ........ *G06F 17/2755* (2013.01); *G06F 17/278* (2013.01); *G06F 17/2735* (2013.01);
(Continued)

(58) Field of Classification Search
CPC . G06F 17/27; G06F 17/3061; G06Q 10/0635; G06Q 10/0639
See application file for complete search history.

(56) References Cited

U.S. PATENT DOCUMENTS 7,933,843 B1 *   4/2011   von Groll .............. G06Q 50/01
                                                           704/9
8,478,699 B1 *   7/2013   Alfonseca ........... G06F 17/3064
                                                           706/12
(Continued)

FOREIGN PATENT DOCUMENTS

KR    10-2011-0089529 A    8/2011
KR    10-2012-0070850 A    7/2012
KR    10-2014-0139466 A    12/2014

OTHER PUBLICATIONS

Yates, et al., "Detecting parser errors using Web-based semantic filters," Proceedings of the EMNLP, 2006.*
(Continued)

*Primary Examiner* — Forrest F Tzeng
(74) *Attorney, Agent, or Firm* — Novick, Kim & Lee, PLLC; Sang Ho Lee (57) ABSTRACT

A device for analyzing reputation for objects by data mining is provided. The device includes a big data collector assembly collecting first information from a web page, a text preprocessor assembly analyzing morpheme information from an original text of the first information, an ontology dictionary extender assembly classifying the morpheme information according to each category and extracting an associated word, an object recognizer assembly measuring similarity between the associated word from the morpheme information to recognize a plurality of entity names associated with a first object, an information sensitivity classifier assembly classifying sensitivity of the first information based on a frequency of a sensitive word associated with the first object from the morpheme information, and a risk evaluation modeler assembly deriving a numeric risk value of the first information according to a numeric sensitivity value of the sensitive word and a weight value level for evaluating event importance.

16 Claims, 5 Drawing Sheets

(52) U.S. Cl.
CPC .......... *G06F 17/2785* (2013.01); *G06F 17/27* (2013.01); *G06F 17/3061* (2013.01); *G06Q 10/0635* (2013.01); *G06Q 10/0639* (2013.01)

(56) References Cited

U.S. PATENT DOCUMENTS

| | | | | |
|---|---|---|---|---|
| 8,606,815 | B2* | 12/2013 | Chen | G06F 17/30864 |
| | | | | 707/737 |
| 2007/0067281 | A1* | 3/2007 | Matveeva | G06F 17/2715 |
| 2007/0198530 | A1* | 8/2007 | Takahashi | G06F 17/3061 |
| 2010/0228733 | A1* | 9/2010 | Harrison | G06F 17/30613 |
| | | | | 707/739 |
| 2011/0145264 | A1* | 6/2011 | Hwang | G06F 17/3064 |
| | | | | 707/754 |
| 2012/0089400 | A1* | 4/2012 | Henton | G10L 13/02 |
| | | | | 704/260 |
| 2012/0101870 | A1* | 4/2012 | Gates | G06Q 10/0635 |
| | | | | 705/7.28 |
| 2012/0109758 | A1* | 5/2012 | Murdock | G06Q 30/02 |
| | | | | 705/14.72 |
| 2012/0226627 | A1* | 9/2012 | Yang | G06Q 30/018 |
| | | | | 705/347 |
| 2012/0296845 | A1* | 11/2012 | Andrews | G06Q 40/06 |
| | | | | 705/36 R |
| 2012/0316916 | A1* | 12/2012 | Andrews | G06Q 40/08 |
| | | | | 705/7.28 |
| 2015/0127323 | A1* | 5/2015 | Jacquet | G06F 17/271 |
| | | | | 704/9 |

OTHER PUBLICATIONS

Kang-Bok Lee, "Estimating a Pleasure-Displeasure Index of Word Using Similarity Between Sentiment Words Based on Word Association Vectors", Department of Computer Science and Engineering of Soongsil University, Dec. 2013.

Dongyoung Kim, "A Study on Stock Price Prediction Model Using Sentiment Analysis and Machine Learning Based on SNS and News Articles", Soongsil University, Dec. 2014.

* cited by examiner

DEVICE AND METHOD FOR ANALYZING REPUTATION FOR OBJECTS BY DATA MINING

CROSS-REFERENCE TO RELATED APPLICATION

This application claims priority to and the benefit of Korean Patent Application No. 10-2015-0094132, filed on Jul. 1, 2015, the disclosure of which is incorporated herein by reference in its entirety.

BACKGROUND

The present disclosure relates to a device and a method for analyzing reputation for objects by data mining, and more particularly, to a device and method for analyzing corporate reputations by automatically collecting and analyzing atypical data including news to provide a corporate risk evaluation model, and a recording medium for performing the method.

With the recent development of the Internet, the analysis of big data is developing. Data mining is a process of discovering useful hidden correlations from various types of data to extract information used in the future and use the extracted information in a decision. That is, the data mining is to discover a hidden pattern and a relation from the data and discover information as if discovering a vein of ore. Here, the information discovery may be the core technology of database (DB) marketing as a process of finding a useful pattern and a relation by applying high-level statistical analysis and a modeling technique to the data.

For example, products well sold on Friday morning, a correlation between the sold products, etc. are discovered by analyzing data of a sales DB in one department store and information about the discovered products and correlation are considered in the marketing. Accordingly, an essential element of data mining is having sufficient materials with high reliability. This is because materials with high reliability enable accurate prediction. However, because large volume of irrelevant materials may degrade the accuracy of the prediction capability, it is necessary to secure relevant materials for producing an optimum result.

The data mining in Korea is still in an initial phase. However, the data mining technology is expected to grow in the near future. This is because many data warehouses serving as an optimum system for the data mining are already constructed in Korea. Also, the development of the data mining may be necessary because corporate requirements go toward DB marketing mainly based on customer management.

SUMMARY OF THE DISCLOSURE

Therefore, the present disclosure has been conceived in view of the above-described circumstances and an objective of the present disclosure is to provide a device for analyzing corporate reputation that provides a risk evaluation model having high reliability through data mining of news.

Another objective of the present disclosure is to provide a method of analyzing corporate reputation that provides a risk evaluation model having high reliability through data mining of news.

Still another objective of the present disclosure is to provide a recording medium storing a computer program for performing the method of analyzing the corporate reputation that provides a risk evaluation model having high reliability through data mining of news.

According to an exemplary embodiment for achieving the above-described objective of the present disclosure, a device for analyzing reputation for objects by data mining is provided. The device includes a big data collector assembly collecting first information from a web page, a text preprocessor assembly analyzing morpheme information from an original text of the first information, an ontology dictionary extender assembly classifying the morpheme information according to each category and extracting an associated word, an object recognizer assembly measuring similarity between the associated word from the morpheme information to recognize a plurality of entity names associated with a first object, an information sensitivity classifier assembly classifying sensitivity of the first information based on a frequency of a sensitive word associated with the first object from the morpheme information, and a risk evaluation modeler assembly deriving a numeric risk value of the first information according to a numeric sensitivity value of the sensitive word and a weight value level for evaluating event importance. The big data collector assembly includes a news crawler visiting the web page and collecting the first information, a hypertext markup language (HTML) parser parsing an HTML structure of the first information to extract second information that meets a predetermined condition, and a storage unit storing the second information in a database (DB).

The text preprocessor assembly includes a morpheme analyzer extracting a morpheme from the original text of the first information to generate a word-specific frequency list, and a spam document eliminator eliminating spam news from the first information.

The ontology dictionary extender assembly includes a search word mapper classifying the morpheme information according to each category using a pre-constructed ontology dictionary and extracting the associated word, and an ontology dictionary updater updating the associated word in the ontology dictionary.

The object recognizer assembly includes a word mapper calculating a pointwise mutual information (PMI) value between a noun and a predicate and between a noun and a connective word from the morpheme information, and an automatic allomorph extractor calculating similarity of the associated word based on the PMI value to derive the plurality of the entity names associated with the first object.

The word mapper includes a noun-predicate PMI calculator calculating the PMI value between the noun and the predicate, and a compound word PMI calculator calculating the PMI value between nouns.

The automatic allomorph extractor includes a similarity calculator calculating the similarity of the associated word based on the PMI value, and an associated word list section generating a list of associated entity names based on the associated word and the similarity of each of the associated word.

The object recognizer assembly further includes an entity name dictionary updater extracting associated entity names to update entity name information.

The information sensitivity classifier includes a sensitivity dictionary generator generating a sensitivity dictionary including a polarity value for a sensitive word of the first information, and a corporation-specific sensitivity classifier classifying sensitivity of the first information based on a frequency of the sensitive word.

The risk evaluation modeler assembly evaluates a risk of the first information using a risk weight value model. The device further includes a data visualizer assembly generating visual information based on the numeric sensitivity value.

The data visualizer assembly generates the visual information based on non-financial performance (environmental, social, and governance (ESG)) information of public data along with the numeric sensitivity value.

According to another embodiment of the present disclosure, a method of analyzing reputation for objects by data mining is provided. The method includes collecting first information from a web page, analyzing morpheme information from an original text of the first information, classifying the morpheme information according to each category using a pre-constructed ontology dictionary, measuring similarity between associated words from the morpheme information and recognizing entity names associated with a first object, classifying sensitivity of the first information based on a frequency of a sensitive word associated with the first object from the morpheme information, and deriving a numeric risk value of the first information according to a numeric sensitivity value of the sensitive word and a weight value level for evaluating event importance.

The collecting further includes visiting the web page and collecting the first information, parsing an HTML structure of the first information to extract second information that meets a predefined condition, and storing the second information in a database (DB).

The analyzing includes extracting a morpheme from the original text of the first information to generate a word-specific frequency list, and eliminating spam news from the first information.

The classifying of the morpheme information includes classifying the morpheme information according to each category using a pre-constructed ontology dictionary, and updating the ontology dictionary through a search word map based on the associated words.

The recognizing includes calculating a pointwise mutual information (PMI) value between a noun and a predicate and between a noun and a connective word from the morpheme information, and calculating similarity of the associated words based on the PMI value to derive a plurality of the entity names associated with the first object.

The classifying of the sensitivity of the first information generating a sensitivity dictionary including a polarity value for the sensitive word of the first information, and classifying sensitivity of the first information based on a frequency of the sensitive word.

The deriving comprises evaluating a risk of news using a risk weight value model. The method further includes generating visual information based on the numeric sensitivity value.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

The following description of the present disclosure will be made with reference to the accompanying drawings which illustrate various exemplary embodiments for practicing the present disclosure by way of an example. Hereinafter, the present disclosure will be described in detail with reference to the accompanying drawings in order to allow a person ordinarily skilled in the art to fully understand the present disclosure. It shall be noted that the various embodiments are different from each other but need not to be exclusive to each other. For example, a specific shape, configuration and characteristic of an exemplary embodiment described herein may be implemented in another exemplary embodiment without departing from the spirit and scope of the present disclosure. In addition, it shall be understood that a position or arrangement of an individual component in each of the exemplary embodiments disclosed herein may be changed without departing from the spirit and scope of the present disclosure. Therefore, the following detailed description is not intended to limit the present disclosure, and the scope of the present disclosure, when it is properly described, covers all the equivalents to the claimed disclosure and is limited only by the accompanying claims. Similar reference signs indicate components with identical or similar functions from various aspects.

Hereinafter, preferred exemplary embodiments of the present disclosure will be described in further detail with reference to the drawings.

Figure 1:
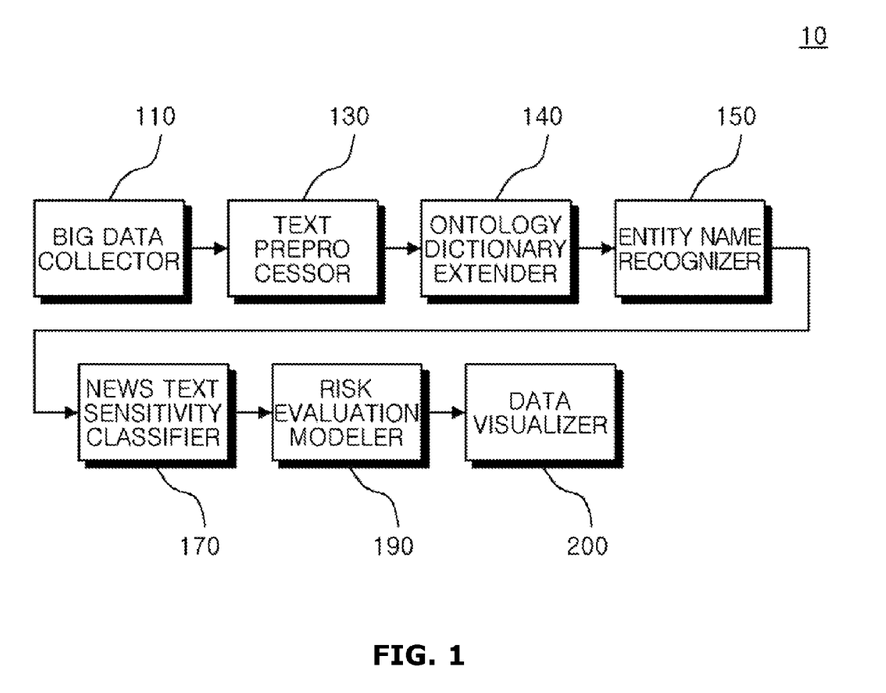
FIG. 1 is a block diagram of a device for analyzing corporate reputation by data mining of news according to an exemplary embodiment of the present disclosure.

FIG. 1 is a block diagram of a device for analyzing corporate reputation by data mining of news according to an exemplary embodiment of the present disclosure.

The device 10 for analyzing the corporate reputation by the data mining of the news or relevant information (hereinafter referred to as the device 10) according to the present disclosure analyzes the reputation of objects, i.e. corporate through an analysis of big data including news data. Although reputation of corporation has been described below, the present disclosure is not limited thereto, and the such objects can include, but not limited to, a person, any type of organization, any event, political party, a nation etc.

Referring to FIG. 1, the device 10 according to the present disclosure includes a big data collector 110, a text preprocessor 130, an ontology dictionary extender 140, an entity name recognizer 150, a news text sensitivity classifier 170, and a risk evaluation modeler 190. The device 10 according to another exemplary embodiment of the present disclosure may further include a data visualizer 200.

In the device 10 of the present disclosure, software (application) or hardware associated with the software for analyzing the corporate reputation by the data mining of the news may be installed and executed. The components of the big data collector 110, the text preprocessor 130, the ontology dictionary extender 140, the entity name recognizer 150, the news text sensitivity classifier 170, the risk evaluation modeler 190, and the data visualizer 200 may be controlled by the software or the hardware associated with the software for analyzing the corporate reputation by the data mining of the news to be executed in the device 10.

The device 10 may be a separate terminal or a partial module of a terminal. Also, the components of the big data collector 110, the text preprocessor 130, the ontology dictionary extender 140, the entity name recognizer 150, the news text sensitivity classifier 170, the risk evaluation modeler 190, and the data visualizer 200 may be formed as one integrated software module or implemented as two or more software modules, which may be associated with computer electronic components. However, each of the components may be implemented as a separate module.

The device 10 may be a mobile device or may be a permanently fixed device. The device 10 may be the form of a server or an engine. The device may be referred to as another term such as an apparatus, a terminal, user equipment (UE), a mobile station (MS), a wireless device, or a handheld device.

Various types of software based on an operating system (OS), that is, a system, may be executed by or made for the device 10. The OS serves as a system program for enabling software to use hardware of the device, and may include all of mobile OSs, such as an Android OS, an iOS, a Windows mobile OS, a Bada OS, a Symbian OS, a BlackBerry OS, etc., and computer OSs such as a Windows-based OS, a Linux-based OS, a Unix-based OS, a Mac OS, an AIX OS, a HP-UX OS, etc.

The big data collector 110 collects social data including news data or relevant information from the web page.

Figure 2:
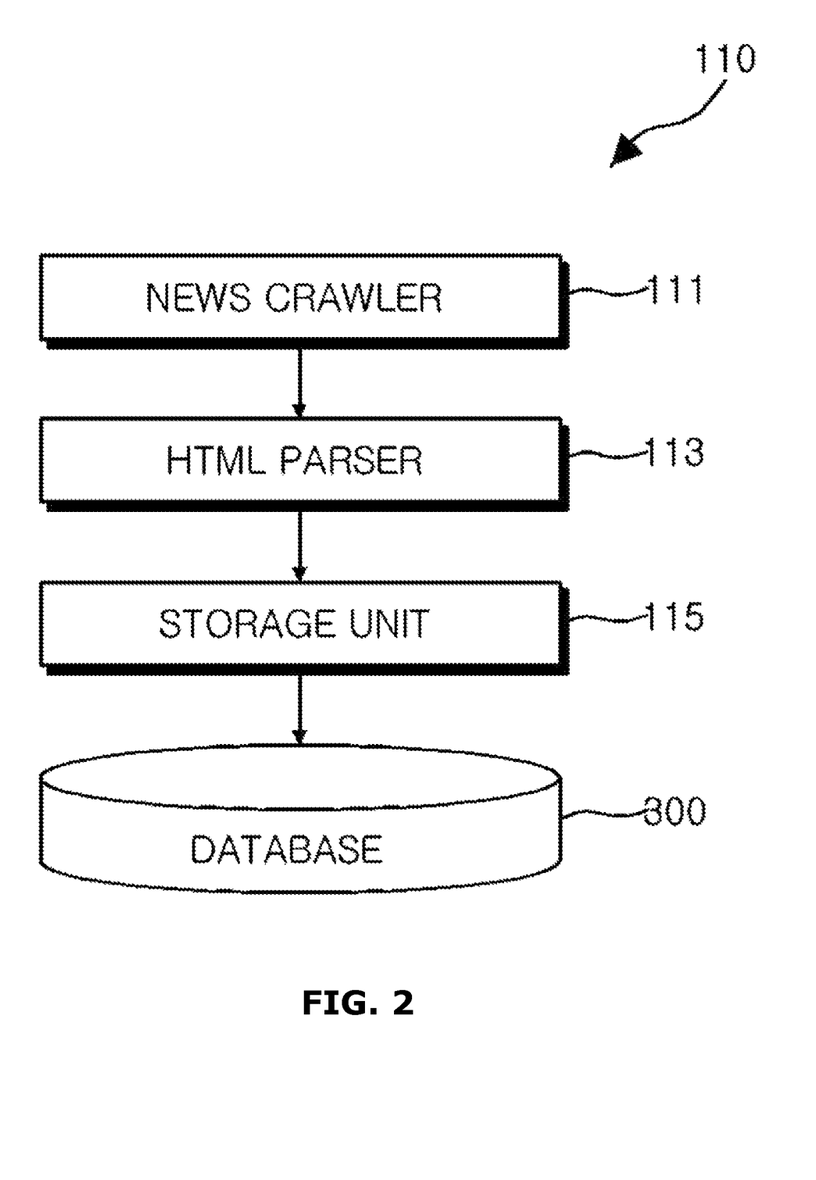
FIG. 2 is a detailed block diagram of a big data collector of FIG. 1.

Referring to FIG. 2, the big data collector 110 may include a news crawler 111, an HTML parser 113, and a storage unit 115.

The news crawler 111 collects the news data periodically or in a specific period after visiting the web page. Alternatively, it may collect news about specific corporations and a source of the news may be broadcasting news, central daily newspapers, local newspapers, major media, online media, etc.

For example, it may collect the news data from various media designated by a user and collect data after continuously visiting a corresponding web page using information such a uniform resource locator (URL) and a page number when the user inputs a collection command.

The HTML parser 113 extracts necessary information by analyzing an HTML structure of the collected news data. Because it is necessary to collect and analyze data from more various types of sources in big data analysis environments, the need for web crawling and HTML parsing technologies is increasing.

The HTML parser 113 automatically recognizes an HTML structure and automatically parses only necessary information from the HTML structure. For example, common elements of the HTML structure are automatically detected, the meaning of a corresponding node within a document object model (DOM) tree is automatically inferred using attribute tags such as a class and an ID, and content desired to be actually collected is automatically collected.

The storage unit 115 stores information extracted by the HTML parser 113 in the designated DB 300.

The text preprocessor 130 analyzes morpheme information from an original text of the news data or information collected by the big data collector 110. The data analyzed by the text preprocessor 130 may be news data stored in the DB 300.

Figure 3:
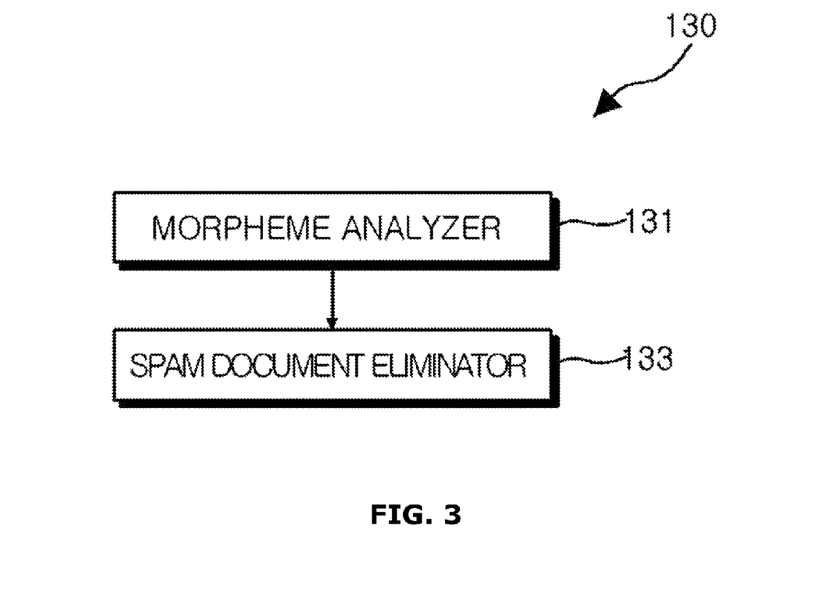
FIG. 3 is a detailed block diagram of a text preprocessor of FIG. 1.

Referring to FIG. 3, the text preprocessor 130 may include a morpheme analyzer 131 and a spam document eliminator 133. Information preprocessed by the text preprocessor 130 may be stored in a preprocessing DB.

The morpheme analyzer 131 extracts a minimum number of meaningful words or morpheme from the original text of the collected news data to construct a list of word-specific frequencies. This is to analyze a meaning relation of collected and filtered news content based on natural language processing and generate an analysis result as structured information through sensitivity analysis.

The morpheme analyzer 131 may perform morpheme analysis using an application programming interface (API) and a multithread morpheme analysis module. At this time, the morpheme analyzer 131 communicates with the API and the multithread morpheme analysis module. At this time, a packet to be communicated uses a predefined class and this class may include metadata such as an identifier for identifying information of a crawled page and information about news data.

The morpheme is defined as the smallest meaningful unit at a morphologic level of a language. When the morpheme is implemented by a specific connection with another morpheme, the morpheme is referred to as an allomorph.

Information for which the morpheme analysis is completed is transmitted to the ontology dictionary extender 140, the entity name recognizer 150, and the news text sensitivity classifier 170. Accordingly, the ontology dictionary extender 140, the entity name recognizer 150, and the news text sensitivity classifier 170 use a morpheme analysis result from the morpheme analyzer 131 instead of the original text of the news.

The spam document eliminator 133 eliminates spam news from the collected news data. Because there are much promotion news and spam news when new products are released in the case of news associated with a corporation, only necessary news data may be stored in the preprocessing DB by eliminating news which is not associated with the present disclosure.

As an example, spam news may be eliminated using Bayesian filtering as shown in the following Equation 1 to eliminate corporate promotion news.

$$Pr(\text{spam} | \text{words}) = \frac{Pr(\text{words} | \text{spam}) Pr(\text{spam})}{Pr(\text{words})} \quad [\text{Equation 1}]$$

A ratio value is read using information about words appearing in collected news after spam news is collected to use the Bayesian filtering and the spam news and ESG-related news may be classified using a pre-calculated result value. It is possible to update ratios of words appearing in specific spam news in all news through continuous learning based on the classification result.

ESG indices refer to non-financial performance and indicate corporate performance in environment-friendly (environmental), social contribution (social), and transparent governance (governance) fields, etc. except for corporate financial performance in measuring the corporate performance. The ESG indices are developed to evaluate the possibility of corporate continuous administration by quantifying corporate social activities which do not appear in a financial element. Recently, the non-financial performance has been given more weight compared with the financial performance.

Figure 4:
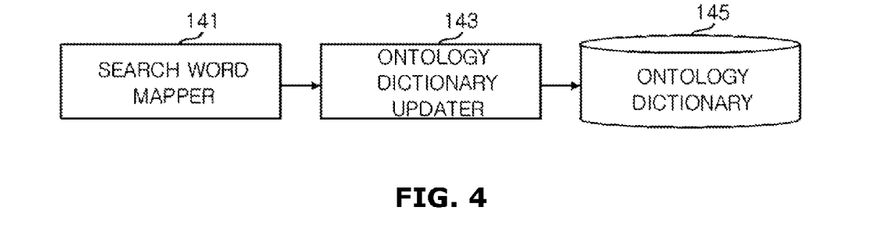
FIG. 4 is a detailed block diagram of an ontology dictionary extender of FIG. 1.

Referring to FIG. 4, the ontology dictionary extender 140 may include a search word mapper 141 classifying the morpheme information according to each category using a pre-constructed ontology dictionary and extract a candidate for an associated word for describing a corresponding topic through a search word map based on the associated word of the pre-constructed ontology dictionary and an ontology dictionary updater 143 updating the associated word in the ontology dictionary 145.

A corporate non-financial risk analysis-related ontology dictionary which is previously generated and held includes associated topics within three categories such as "environmental," "social," and "governance" and associated words for describing the topics. The following Table 1 shows an example of the ontology dictionary.

TABLE 1

| Category | Topic | Associated word |
| --- | --- | --- |
| Environmental | Chemical substance and pollution accident | Chemical accident, air pollution, water pollution, and waste |
| Environmental | Climate change | Greenhouse gas emission |
| Environmental | Waste of resource | Energy inefficiency and raw materials |
| Environmental | Violation of environmental regulation | Violation of national law and violation of international regulation |
| Social | Working environment | Employment discrimination, working conditions, workers human rights, and power harassment |
| Social | Safety and health | Industrial health and safety |
| Social | Supply network and fair operation practice | Fair competition and supply network |
| Social | Violation of law | Violation of law |
| Social | Consumer problem | Guarantee of health and safety of consumer, and fair marketing |
| Social | Social community issue | Community development |
| Governance | Morality (corruption, bribery, money laundering, fraud, etc.) | Ethical management, corruption, bribery, money laundering, and fraud |
| Governance | Executive compensation | Compensation unrelated to performance |
| Governance | Unreliable risk management | Responsible management |
| Governance | Tax evasion | Tax evasion |
| Governance | Injustice competitive act | Internal transaction |

The entity name recognizer 150 measures similarity between words from the morpheme information transmitted from the text preprocessor 130 to recognize entity names associated with a specific entity name. In the case of the corporation, when an abbreviation or another name for a cooperation name is used instead of the corporation name registered in Korea Exchange and the corporation name is the same as a general noun, the corporation name may be confused (for example, CJ Cheil Jedang/Cheil Jedang).

In particular, in social big data, the same corporation name may be written as an allomorph in the case of the news (for example, SKT/SKTelecom, etc.). Also, even when the corporation name is a form of a compound noun including a name of a holding company in the case of an affiliate of a major company, technology for recognizing a correct entity name by distinguishing affiliates from the holding company is necessary (for example, LG Corp. vs. LG Electronics/LG Chem./LG International Corp./LG Household & Health Care, etc.).

Figure 5:
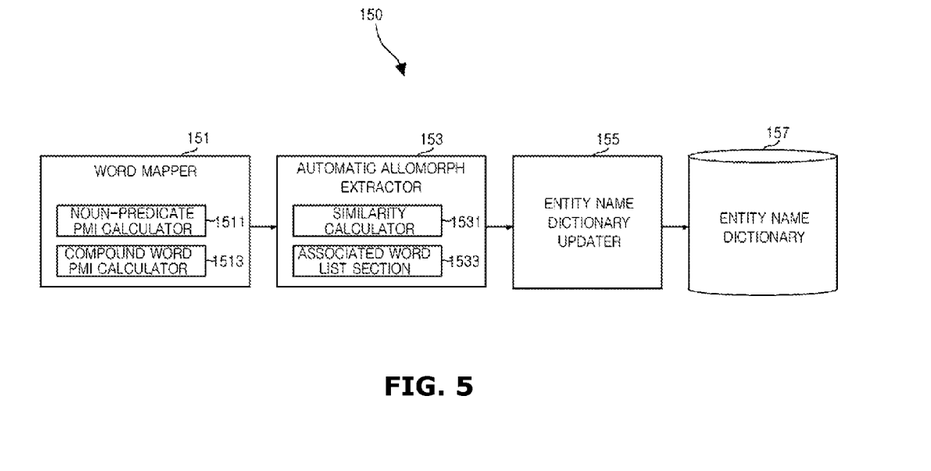
FIG. 5 is a detailed block diagram of an entity name recognizer of FIG. 1.

To solve the above-described problems, the entity name recognizer 150 may extract entity name candidate information using the word mapper 151 and the automatic allomorph extractor 153 and update the entity name dictionary through continuous learning. The word mapper 151 calculates pointwise mutual information (PMI) values between a noun and a predicate and between a noun and a connective word from the morpheme information, and the automatic allomorph extractor 153 calculates similarity of the associated word based on the calculated PMI values and derives entity names associated with the specific entity name.

For this, as a preprocessing operation, the text preprocessor 130 may extract a compound noun from news word-specific data to generate a list of high-frequency compound nouns, extract appearance frequencies for a compound noun and a connective word using the list of high-frequency compound nouns, and transfer the appearance frequencies to the entity name recognizer 150.

In addition, the text preprocessor 130 may generate a list of high-frequency nouns and a list of high-frequency predicates after extracting nouns and predicates using the morpheme analyzer from news-sentence-specific data, generate a list of frequencies of co-occurrences of noun-predicate after calculating word-specific frequencies, and transfer the list of co-occurrence frequencies to the entity name recognizer 150.

Referring to FIG. 5, the word mapper 151 may include a noun-predicate PMI calculator 1511 calculating a PMI value between a noun and a predicate and a compound word PMI calculator 1513 calculating a PMI value between nouns.

The word mapper 151 may generate a PMI list through PMI calculation from a frequency of co-occurrence of a high-frequency compound noun (noun-noun) and a frequency of co-occurrence of noun-predicate. The following Equation 2 is a formula for calculating a PMI value between a noun and a predicate and the following Equation 3 is a formula for calculating a PMI value between a noun and a connective word of the compound noun.

$$PMI(f_i, w_j; c) = \log_2 \frac{P(f_i, w_j; c)}{P(f_i; c) \cdot P(w_j; c)} \quad \text{[Equation 2]}$$

$$PMI(f_i, w_j; c, d) = \log_2 \frac{P(f_i, w_j; c, d)}{P(f_i; c) \cdot P(w_j; c)} \quad \text{[Equation 3]}$$

Here, $F_c = \{f_1, f_2, \ldots f_c\}$ is a set of feature words of news data c, $W_c = \{w_1, w_2, \ldots w_c\}$ is a set of associated words of the news data c, and $S_c=\{s_1, s_2, \ldots s_c\}$ is a set of sentences appearing in the news data c.

The automatic allomorph extractor 153 may include a similarity calculator 1531 calculating the similarity of the associated word based on the calculated PMI values, and an associated word list section 1533 generating a list of the associated entity names based on the associated word and the similarity of each associated word.

The automatic allomorph extractor 153 generates an associated word list by calculating similarity from a compound name PMI list and a noun-predicate PMI list. In the following Equation 4, cosine similarity between a noun and a candidate for an allomorph is calculated using PMI between a noun and a predicate as a vector value.

$$\text{Similarty}(f_i n_j; c) = \frac{\sum_{k=1}^{q} PMI(f_i w_k; c) * PMI(n_j w_k; c)}{\sqrt{\sum_{k=1}^{q} PMI(f_i w_k; c)^2} * \sqrt{\sum_{k=1}^{q} PMI(n_j w_k; c)^2}}$$

[Equation 4]

Here, $F_c=\{f_1, f_2, \ldots f_c\}$ is a set of feature words of news data c and $N_c=n_1, n_2, \ldots n_c$ is a set of nouns serving as allomorph candidates of the news data c.

The entity name recognizer 150 may further include an entity name dictionary updater 155 extracting the associated entity names to update entity name information in the entity name dictionary 157.

The news text sensitivity classifier 170 classifies the sensitivity of news or relevant information based on a frequency of a sensitive word associated with a specific entity name from the morpheme information. At this time, the specific entity name may include all associated entity names derived from the entity name recognizer 150. Accordingly, because an accurate result may be derived without losing data and the entity name dictionary is continuously updated, an optimized function may be provided according to an environmental change.

Figure 6:
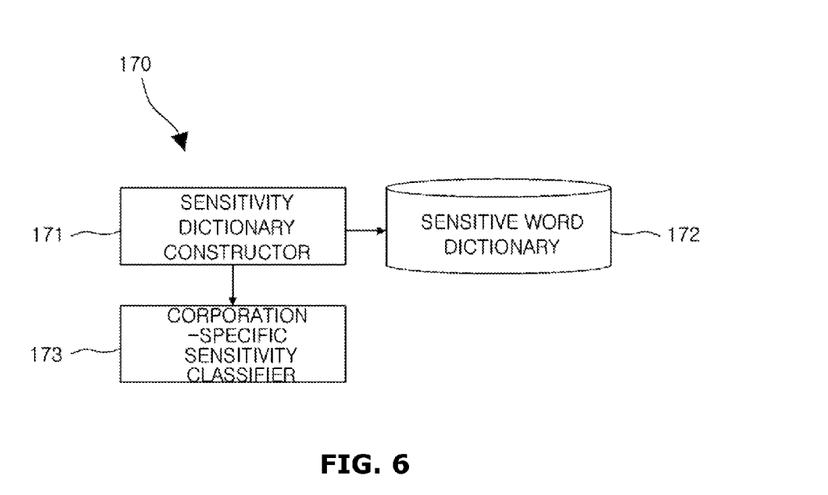
FIG. 6 is a detailed block diagram of a news text sensitivity classifier of FIG. 1.

Referring to FIG. 6, the news text sensitivity classifier 170 includes a sensitivity dictionary constructor 171 generating a sensitive word dictionary including a polarity value for each sensitive word and a corporation-specific sensitivity classifier 173 classifying sensitivity of news text based on a frequency of a sensitive word.

The corporation-specific sensitivity classifier 173 may utilize the fluctuations of stock prices, etc. of a date on which news including the sensitive word is released.

The risk evaluation modeler 190 derives a calculation result of one news document through a risk evaluation module. Specifically, it may calculate a numeric sensitivity value for specific news as an average of polarities of sensitive words appearing in the specific news and calculate a numeric sensitivity value for a specific date from daily news.

The risk evaluation modeler 190 derives a numeric sensitivity value of news according to a sensitivity level of the sensitive word. Specifically, the risk evaluation modeler 190 collects information about numeric sensitivity values of words appearing in a news document using derived sensitive word information.

The risk evaluation modeler 190 may derive a final risk score by adding a weight value to each feature of news. As an embodiment of the present disclosure, the risk evaluation modeler 190 may evaluate importance by assigning a weight value to an event when the number of news or information for the same event is more than a predetermined number or has higher number in comparison with average number.

For example, the possibility of exposure to major media is lower when an event occurs in small and medium-sized businesses than when an event occurs in a major company. Accordingly, to solve such a problem, it may also evaluate a risk score of one news document by assigning a weight value to news appearing in community news.

In addition, the risk evaluation modeler 190 may also evaluate the importance of an event by performing similar evaluation on a number appearing with an appearance word. For example, because an importance of an event having one injured person and fifty died persons is different from that of another event having fifty injured persons and one died person, the influence of a number appearing with a specific word may be considered in the risk evaluation occurring in the corporation.

The following Table 2 is an example of a feature to which a weight value is applied and the weight value.

TABLE 2

| Feature | Weight value |
|---|---|
| Number of news documents generated for the same event (frequency of appearance word) | 0.03 |
| Number of comments for news document | 0.01 |
| Number of appearances in local media (major media are excluded) | 0.03 |
| Number of died persons | 0.03 |
| Number of injured persons | 0.02 |
| . . . | . . . |

The risk evaluation modeler 190 may derive a final risk score using a calculation result such as information about all news documents generated on the same date as information about a word appearing within the new document to evaluate a risk score for one news document.

Thus, in the present disclosure, a positive or negative language included in a text of news data collected based on a specific subject may be detected and the detected positive or negative language may be quantified and statistically utilized to analyze corporate reputation.

The data visualizer 200 expresses a result derived through the risk evaluation modeler 190 as visual information so that people may easily understand the derived result. The data visualizer 200 may provide non-financial performance (ESG) information of public data as visual information with the above-described numeric sensitivity value.

The user may receive an interface through the data visualizer 200 and perceive a result for corporation risk evaluation as visual information capable of being easily understood. For example, when the user inputs a corporation name desired to be found to a main search window, he/she may read a total score, ESG indices, and a summary score of reputation for a corporation as search results and obtain a further detailed report according to each category after clicking a corporation name.

In addition to a method of obtaining information about a specific corporation by performing a search of a corporation name, it may compare search results based on Korea composite stock price index (KOSPI) information, Korea securities dealers automated quotation (KOSDAQ) information, industrial information, industrial classification information, unlisted company information, public institution information, etc. through an application and a menu of an application. The user may continuously monitor a specific corporation using a portfolio included in a dedicated page and recommended corporation information may be provided based on corporation information designated by the user within the dedicated page.

As an example of a user graphic interface (GUI) provided by the data visualizer 200, a page provided to a user may roughly include pages for a main search, About, Who's Board, and My Page. The main search page serves as a screen for finding information about a corresponding corporation when a corporation name desired to be known is input. When the corporation name is input to a search input window, a search result and reputation associated with the corresponding corporation are shown. It may divide information about a corporation to be read into continuation possibility, ESG categories, a financial summary, and reputation and read non-financial information and new analysis results for the corporation. It may read information about Over View, Key Figure, detailed evaluation for a corresponding category, etc. from pages for the continuation possibility and the ESG categories.

It may read corporation-specific news text, sensitivity classification information, a risk score, etc. by utilizing news data from the page for Reputation. It may compare item scores for a corporation input by the user for ESG categories with industrial averages to show comparison results and show a social reputation change trend according to each period. Also, the user may read an associated word for a corresponding corporation input by the user using a word cloud and read news from issue-specific social main content.

It may read the description of Who's Good and the description of analysis criteria from the page of About. The page for Who's Board may be implemented and expressed as a bar graph, a scatter graph, and a line graph for checking results of top 100 based on divisions of KOSPI information, KOSDAQ information, industrial information, industrial classification information, unlisted company information, public institution information, etc. according to each category of reputation.

The page for My Page provides a portfolio so that a user-designated corporation may be continuously monitored. An administrator page provides differentiated information for a paying member and a non-paying member through a member management function based on grades classified for information provision. General management functions for user authentication and right management, server environment setting, user search result management, a screen configuration change, etc. and a service providing function may be configured.

However, the above-described user GUI is only one example, but the present disclosure is not limited thereto. If necessary, a menu or function may be freely added, deleted, and modified.

Figure 7:
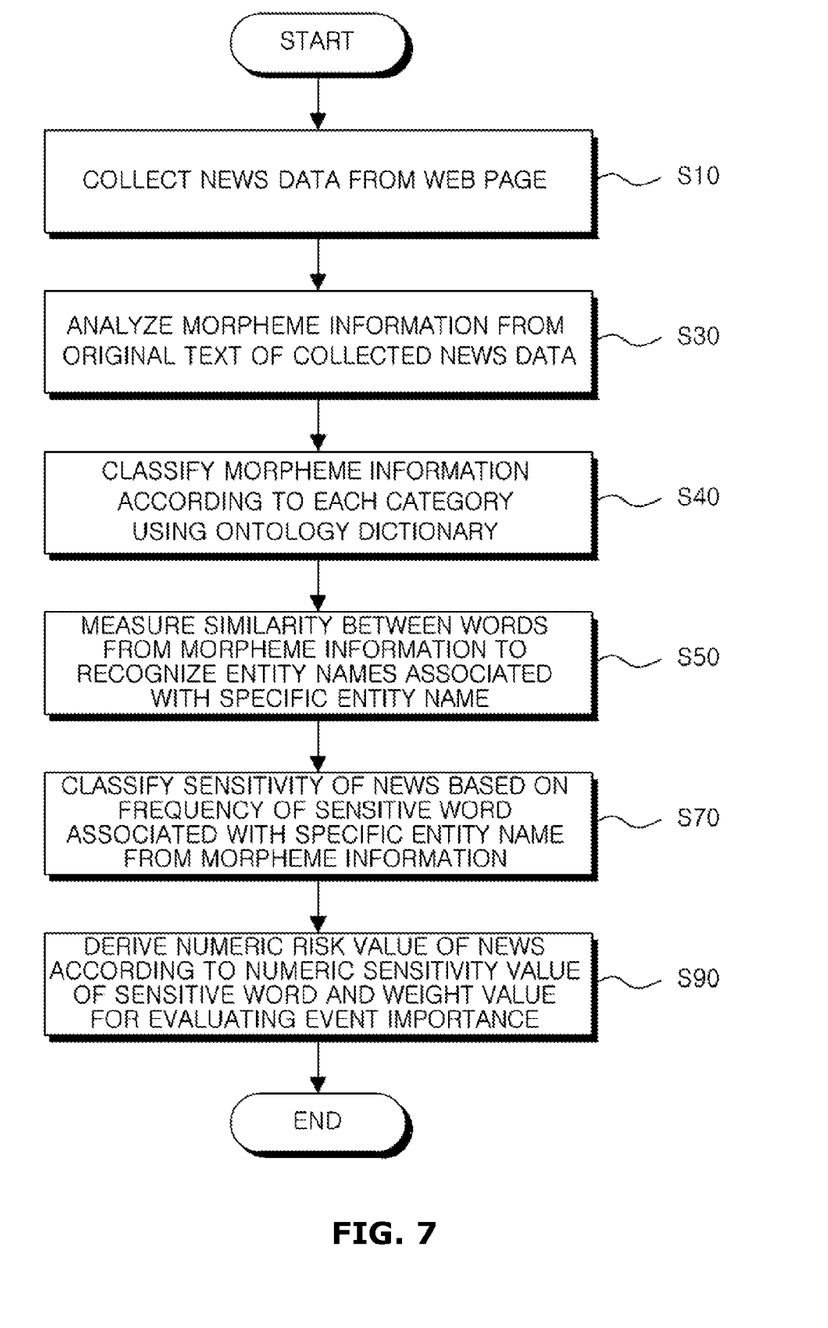
FIG. 7 is a flowchart of a method of analyzing corporate reputation by data mining of news according to an exemplary embodiment of the present disclosure.

FIG. 7 is a flowchart of a method of analyzing corporate reputation by data mining of news according to an exemplary embodiment of the present disclosure.

The method of analyzing the corporate reputation by the data mining of the news according to this exemplary embodiment may be performed using substantially the same configuration as that of the device 10 of FIG. 1. Accordingly, the same components as those of the device 10 of FIG. 1 are assigned the same reference signs and redundant description will be omitted. In addition, the method of analyzing the corporate reputation by the data mining of the news according to this exemplary embodiment may be executed by software (application).

Referring to FIG. 7, in the method of analyzing the corporate reputation by the data mining of the news according to this exemplary embodiment, news data is collected from a web page (S10).

The collection of the news data from the web page (S10) may include collecting the news data after visiting the web page, parsing an HTML structure of the collected news data to extract necessary information, and storing the extracted information in a DB.

When the news data is collected, morpheme information is analyzed from an original text of the collected news data (S30).

The analysis of the morpheme information from the original text of the collected news data (S30) may include extracting a minimum number of meaningful words from the original text of the collected news data to generate a word-specific frequency list, and eliminating spam news from the collected news data.

When the morpheme information analysis is completed, the morpheme information is classified according to each category (S40). Operation S40 may include classifying the morpheme information according to each category using a pre-constructed ontology dictionary and updating the ontology dictionary through a search word map based on the associated word.

Subsequently, similarity between associated words is measured from the morpheme information and entity names associated with a specific entity name are recognized (S50).

The recognition of the entity names associated with the specific entity name (S50) may include calculating PMI values between a noun and a predicate and between a noun and a connective word from the morpheme information and calculating similarity of the associated word based on the calculated PMI values to derive the entity names associated with the specific entity name.

The calculating of the PMI values between a noun and a predicate and between a noun and a connective word from the morpheme information may include calculating a PMI value between the noun and the predicate, and calculating a PMI value between nouns. The deriving of the associated word may include calculating similarity of the associated word based on the calculated PMI values and generating a list according to the associated word and the similarity of each associated word.

Subsequently, a sensitivity of news is classified based on a frequency of a sensitive word associated with the specific entity name from the morpheme information (S70). At this time, it may utilize the fluctuations of stock prices, etc. of a date on which news including the sensitive word is released.

The classification of the sensitivity of the news (S70) may include constructing a sensitivity dictionary including a polarity value for each sensitive word and classifying sensitivity of news text based on a frequency of the sensitive word.

The method includes deriving a numeric risk value of the news according to a numeric sensitivity value of the sensitive word and a weight value level for evaluating event importance (S90). In the deriving of the numeric risk value of the news (S90), a risk of news may be evaluated using a risk weight value model.

In addition, the method of analyzing the corporate reputation by the data mining of the news according to this exemplary embodiment may further include providing the derived numeric sensitivity value as visual information. In the visual information, non-financial performance (ESG) information of public data may be provided with the numeric sensitivity value.

The method of analyzing corporate reputation by data mining of news may be implemented in the form of program instructions executable by a computer software application or various computer components, and then recorded on a computer-readable medium. The computer-readable medium may include program instructions, a data file, a data structure, or a combination thereof.

The program instructions recorded on the computer-readable medium may be designed and configured specifically for the present disclosure or can be publically know and available to those who are skilled in the field of software.

Examples of the computer-readable medium may include a hardware device including a magnetic medium, such as a hard disk, a floppy disk, or a magnetic tape, an optical recording medium, such as a compact disc read only memory (CD-ROM) or a digital video disc (DVD), a magneto-optical medium, such as a floptical disk, a ROM, a read access memory (RAM), or a flash memory, which is specifically configured to store and execute the program instructions.

Examples of the program instructions may include machine codes made by, for example, a compiler, as well as high-level language codes executable by a computer with an interpreter. The above exemplary hardware devices may be configured to operate as one or more software modules in order to perform the operation in an exemplary embodiment, and vice versa.

According to the method of analyzing the corporate reputation by the data mining of the news as described above, a positive or negative language included in a text of news data collected based on a specific subject is detected and the detected positive or negative language is quantified and utilized to analyze the corporate reputation. Accordingly, the analysis is performed based on realistic characteristics transferred from the meaning of the news data and entity, event, time, and place information extraction is possible for issue analysis. Accordingly, it is possible to guide accurate decisions by providing an analysis result having high reliability.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

According to the present disclosure, it is possible to obtain technical achievements for an automatic atypical data collection technique, a large-capacity text preprocessing technique, an ontology dictionary construction technique, an entity name recognition technique, a news text sensitivity classification technique, a risk evaluation model, and a visualization expression technique. Also, it is possible to apply the present disclosure to various business fields such as investment and marketing by providing corporate risk evaluation results having high reliability.

What is claimed is:

1. A device for analyzing reputation for objects and having data mining computer electronic components, the device comprising:
a big data collector assembly having one or more processors processing big data and a storage unit storing data in a database (DB), and collecting first information from a web page;
a text preprocessor assembly analyzing morpheme information from an original text of the first information;
an ontology dictionary extender assembly classifying the morpheme information according to each category and extracting an associated word;
an object recognizer assembly measuring a similarity between the associated word from the morpheme information and recognizing a plurality of entity names associated with a first object based on the similarity;
an information sensitivity classifier assembly classifying a sensitivity of the first information based on a frequency of a sensitive word associated with the first object and the plurality of entity names from the morpheme information; and
a risk evaluation modeler assembly deriving a numeric risk value of the first information according to a numeric sensitivity value of the sensitive word and a weight value level for evaluating event importance,
wherein the numeric sensitivity value of the sensitive word is calculated based on a level of the sensitivity of the first information,
wherein the object recognizer assembly comprises:
a word mapper calculating a pointwise mutual information (PMI) value between a noun and a predicate and between a noun and a connective word from the morpheme information;
an automatic allomorph extractor calculating similarity of the associated word based on the PMI value to derive the plurality of the entity names associated with the first object,
wherein the similarity is calculated using the equation as follows $$\text{Similarity}(f_i n_j; c) = \frac{\sum_{k=1}^{q} PMI(f_i w_k; c) * PMI(n_j w_k; c)}{\sqrt{\sum_{k=1}^{q} PMI(f_i w_k; c)^2} * \sqrt{\sum_{k=1}^{q} PMI(n_j w_k; c)^2}}$$

wherein $F_c=\{f_1, f_2, \ldots, f_o\}$ is a set of feature words of news data c and $N_c=\{n_1, n_2, \ldots, n_o\}$ is a set of nouns serving as allomorph candidates of the news data c; and
a data visualizer assembly generating visual information based on the numeric sensitivity value on a screen.

2. The device of claim 1, wherein the big data collector assembly comprises:
a news crawler visiting the web page and collecting the first information;
a hypertext markup language (HTML) parser parsing an HTML structure of the first information to extract second information that meets a predetermined condition; and
the storage unit storing the second information in a database (DB).

3. The device according to claim 1, wherein the text preprocessor assembly comprises:
a morpheme analyzer extracting a morpheme from the original text of the first information to generate a word-specific frequency list; and
a spam document eliminator eliminating spam news from the first information.

4. The device of claim 1, wherein the ontology dictionary extender assembly comprises:
a search word mapper classifying the morpheme information according to each category using a pre-constructed ontology dictionary and extracting the associated word; and an ontology dictionary updater updating the associated word in the ontology dictionary.

5. The device of claim 1, wherein the word mapper comprises:
a noun-predicate PMI calculator calculating the PMI value between the noun and the predicate; and
a compound word PMI calculator calculating the PMI value between nouns.

6. The device of claim 1, wherein the automatic allomorph extractor comprises:
a similarity calculator calculating the similarity of the associated word based on the PMI value; and
an associated word list section generating a list of associated entity names based on the associated word and the similarity of each of the associated word.

7. The device of claim 1, wherein the object recognizer assembly further comprises an entity name dictionary updater extracting associated entity names to update entity name information.

8. The device of claim 1, wherein the information sensitivity classifier comprises:
a sensitivity dictionary generator generating a sensitivity dictionary including a polarity value for the sensitive word of the first information; and
a corporation-specific sensitivity classifier classifying sensitivity of the first information based on a frequency of the sensitive word.

9. The device of claim 1, wherein the risk evaluation modeler assembly evaluates a risk of the first information using a risk weight value model.

10. The device of claim 1, wherein the data visualizer assembly generates the visual information based on non-financial performance (environmental, social, and governance (ESG)) information of public data along with the numeric sensitivity value.

11. A method of analyzing reputation for objects by data mining computer electronic components, the method comprising:
collecting, by one or more big data processors, first information from a web page and storing data in a storage;
analyzing morpheme information from an original text of the first information;
classifying the morpheme information according to each category using a pre-constructed ontology dictionary;
measuring a similarity between associated words from the morpheme information and recognizing a plurality of entity names associated with a first object based on the similarity;
classifying a sensitivity of the first information based on a frequency of a sensitive word associated with the first object and the plurality of entity names from the morpheme information; and
deriving a numeric risk value of the first information according to a numeric sensitivity value of the sensitive word and a weight value level for evaluating event importance,
wherein the numeric sensitivity value of the sensitive word is calculated based on a level of the sensitivity of the first information,
wherein the recognizing comprises:
calculating a pointwise mutual information (PMI) value between a noun and a predicate and between a noun and a connective word from the morpheme information;
calculating similarity of the associated words based on the PMI value to derive a plurality of the entity names associated with the first object,
wherein the calculating similarity comprises calculation using the equation as follows $$\text{Similarity}(f_i, n_j; c) = \frac{\sum_{k=1}^{q} PMI(f_i, w_k; c) * PMI(n_j, w_k; c)}{\sqrt{\sum_{k=1}^{q} PMI(f_i, w_k; c)^2} * \sqrt{\sum_{k=1}^{q} PMI(n_j, w_k; c)^2}}$$

wherein $F_c = \{f_1, f_2, \ldots, f_c\}$ is a set of feature words of news data c and $N_c = n_1, n_2, \ldots, n_c$ is a set of nouns serving as allomorph candidates of the news data c; and
generating, by a data visualizer assembly, visual information based on the numeric sensitivity value on a screen.

12. The method of claim 11, wherein the collecting further comprises:
visiting the web page and collecting the first information;
parsing an HTML structure of the first information to extract second information that meets a predefined condition; and
storing the second information in a database (DB) in the storage.

13. The method of claim 11, wherein the analyzing comprising:
extracting a morpheme from the original text of the first information to generate a word-specific frequency list; and
eliminating spam news from the first information.

14. The method of claim 11, wherein the classifying of the morpheme information comprises:
classifying the morpheme information according to each category using a pre-constructed ontology dictionary; and
updating the ontology dictionary through a search word map based on the associated words.

15. The method of claim 11, wherein the classifying of the sensitivity of the first information includes:
generating a sensitivity dictionary including a polarity value for the sensitive word of the first information; and
classifying sensitivity of the first information based on a frequency of the sensitive word.

16. The method of claim 11, wherein the deriving comprises evaluating a risk of news using a risk weight value model.

* * * * *